United States Patent
Higashino et al.

[11] Patent Number: 6,151,365
[45] Date of Patent: Nov. 21, 2000

[54] INFORMATION DETECTING APPARATUS AND METHOD

[75] Inventors: Satoru Higashino, Tokyo; Yoshihide Shinpuku, Kanagawa, both of Japan

[73] Assignee: Sony Corporation, Tokyo, Japan

[21] Appl. No.: 09/028,499

[22] Filed: Feb. 24, 1998

[30] Foreign Application Priority Data

Feb. 25, 1997 [JP] Japan ................................. 09-040303

[51] Int. Cl.[7] ............................. H04L 5/12; H04L 25/49
[52] U.S. Cl. ........................................ 375/263; 375/290
[58] Field of Search .................................. 375/373, 376, 375/377, 263, 290, 293, 294; 341/110; 360/42, 40; 329/307, 360

[56] References Cited

U.S. PATENT DOCUMENTS

| | | | |
|---|---|---|---|
| 5,400,364 | 3/1995 | Yada | 375/376 |
| 5,465,059 | 11/1995 | Pan et al. | 327/12 |
| 5,799,046 | 8/1998 | Hayashi | 375/341 |
| 5,808,573 | 9/1998 | Shih et al. | 341/110 |
| 5,835,510 | 11/1998 | Hayashi | 371/43.7 |

*Primary Examiner*—Stephen Chin
*Assistant Examiner*—Albert Park
*Attorney, Agent, or Firm*—Hill & Simpson

[57] ABSTRACT

It is intended to reduce the rate of occurrence of prediction value judgment errors. Where a prediction value $x'_{n-1}$ of a 1-clock preceding code is 0, a judgment circuit 1 outputs a value "1" as a prediction value $x'_n$ if a reproduction signal value $y_n$ sampled at time n is greater than or equal to a threshold value $\eta$ that is supplied from a threshold value generating circuit 6, and outputs a value "−1" as the prediction value $x'_n$ if $y_n < \eta$. Where $x'_{n-1}$ is not 0, the judgment circuit 1 outputs a value "0" as the prediction value $x'_n$. Therefore, the control circuit 1 outputs a value "0" every other clock as a prediction value. During the interval between the first two clocks, the threshold value $\eta$ is set at 0. Then, when supplied with codes of a given pattern that are arranged at the start, a switch 2 selects the prediction value $x'_n$ that is supplied from the judgment circuit 1. An operation circuit 16 calculates a phase error $\Delta\tau_n$ from the prediction value $x'_n$ and the sampled value $y_n$. On the other hand, an operation circuit 17 calculates a level error $\Delta\gamma_n$ from the prediction value $x'_n$ and the sampled value $y_n$.

9 Claims, 15 Drawing Sheets

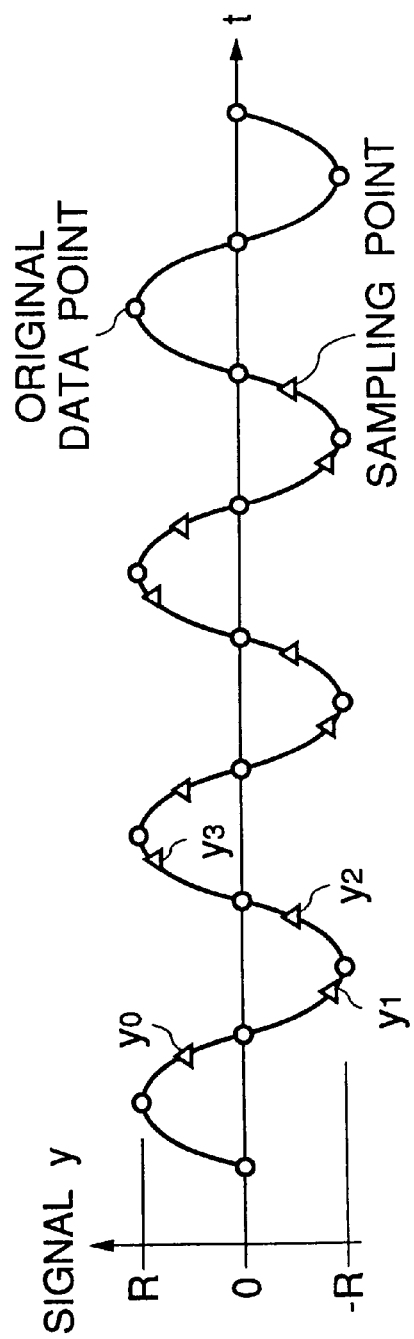
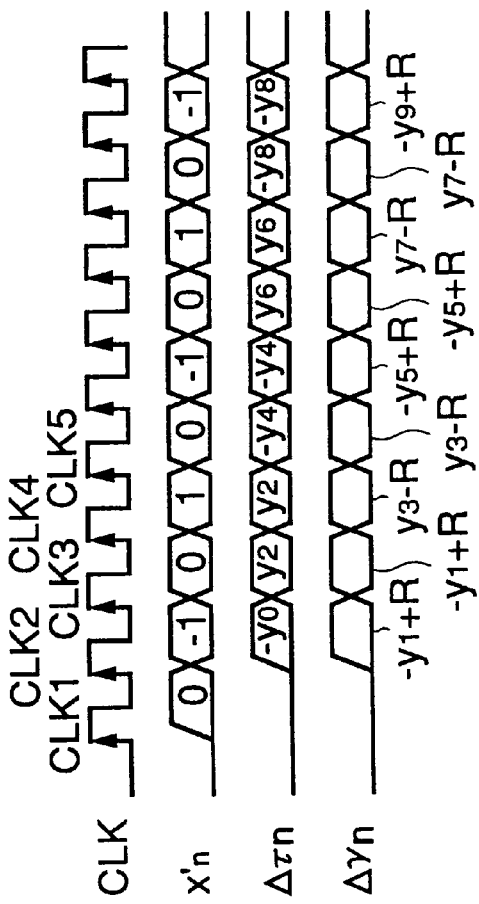
FIG.9A
FIG.9B
FIG.9C
FIG.9D
FIG.9E

INFORMATION DETECTING APPARATUS AND METHOD

BACKGROUND OF THE INVENTION

1. Field of the Invention

The present invention relates to an information detecting apparatus and method and, particularly, to an information detecting apparatus and method for calculating, in accordance with past prediction values of codes, a prediction value of a code by using a given clock signal from a value of an analog signal corresponding to codes of a partial response format that constitute a predetermined, given pattern.

2. Description of the Related Art

In digital communication apparatuses, recording apparatuses, etc., codes of a partial response format, for instance, corresponding to given digital data are supplied via a predetermined medium. The received codes are detected as an analog signal, which is sampled while its amplitude, phase, etc. are adjusted in accordance with its phase and level. The signal is thereafter decoded, for instance.

An apparatus for receiving or reading out data of a partial response format is configured so as to be able to detect data even if a data point is not located at a peak point of a waveform by detecting and utilizing phase information and level information (amplitude information) of a supplied signal.

To detect a phase error and a level error of a signal as phase information and level information, respectively, a phase error $\Delta\tau_n$ and a level error $\Delta\gamma_n$ may be calculated according to the following equations:

$$\Delta\tau_n = -y_n \cdot x'_{n-1} + y_{n-1} \cdot x'_n$$

$$\Delta\gamma_n = (y_n - x''_n) \cdot x'_n + (y_{n-1} - x''_{n-1}) \cdot x'_{n-1}$$

which were proposed by Mr. Roy D. Cideciyan et al. in "A PRML System for Digital Magnetic Recording," IEEE Journal on Selected Areas in Communications, Vol. 10, No. 1, January 1992. In the above equations, $\Delta\tau_n$ represents a phase error (a phase difference between the clock signal and the reproduction signal) at time n, $y_n$ represents a signal value that is sampled at time n, and $x'_n$ represents a prediction value (judgment value) of an original code at time n, $\Delta\gamma_n$ represents a level error at time n, and $x''_n$ represents a signal peak value corresponding to the judgment value $x'_n$.

Where the phase error and the level error are calculated in the above manner, a prediction value $x'_n$ of a code is calculated by using a value $y_n$ of the supplied signal.

It has also been proposed to detect phase information and level information at high speed by adding codes of a given pattern.

However, when an error occurs in prediction values of codes, phase information and level information that are calculated in the above-described manner are not correct and hence it becomes difficult to decode a supplied signal correctly. Further, when a phase error of a 0.5 period occurs due to a judgment error of a prediction value of a code of a partial response (1, 1) format, a long time will elapse until synchronization of the sampling is recovered in a PLL (phase locked loop) and the phase error is converged to a 0 or 1 period (integer period).

SUMMARY OF THE INVENTION

The present invention has been made in view of the above circumstances, and an object of the present invention is to reduce the rate of occurrence of prediction value errors by calculating, in accordance with past prediction values of codes, a prediction value of a code of a partial response format that constitute a given pattern, such as {0, 1, 0, −1 }.

The invention provides an information detecting apparatus comprising prediction value calculating means for calculating a prediction value of a code of a partial response format that constitutes a predetermined, given pattern in accordance with a past prediction value of the code; and information calculating means for calculating level information and/or phase information from a value of an analog signal and the calculated prediction value of the code.

The invention also provides an information detecting method comprising the steps of calculating a prediction value of a code of a partial response format that constitutes a predetermined, given pattern in accordance with a past prediction value of the code; and calculating level information and/or phase information from a value of an analog signal and the calculated prediction value of the code.

BRIEF DESCRIPTION OF THE DRAWINGS

FIGS. 9A–9E are a timing chart illustrating an operation of the information detecting circuit of FIG. 8;

DETAILED DESCRIPTION OF THE PREFERRED EMBODIMENTS

Figure 2:
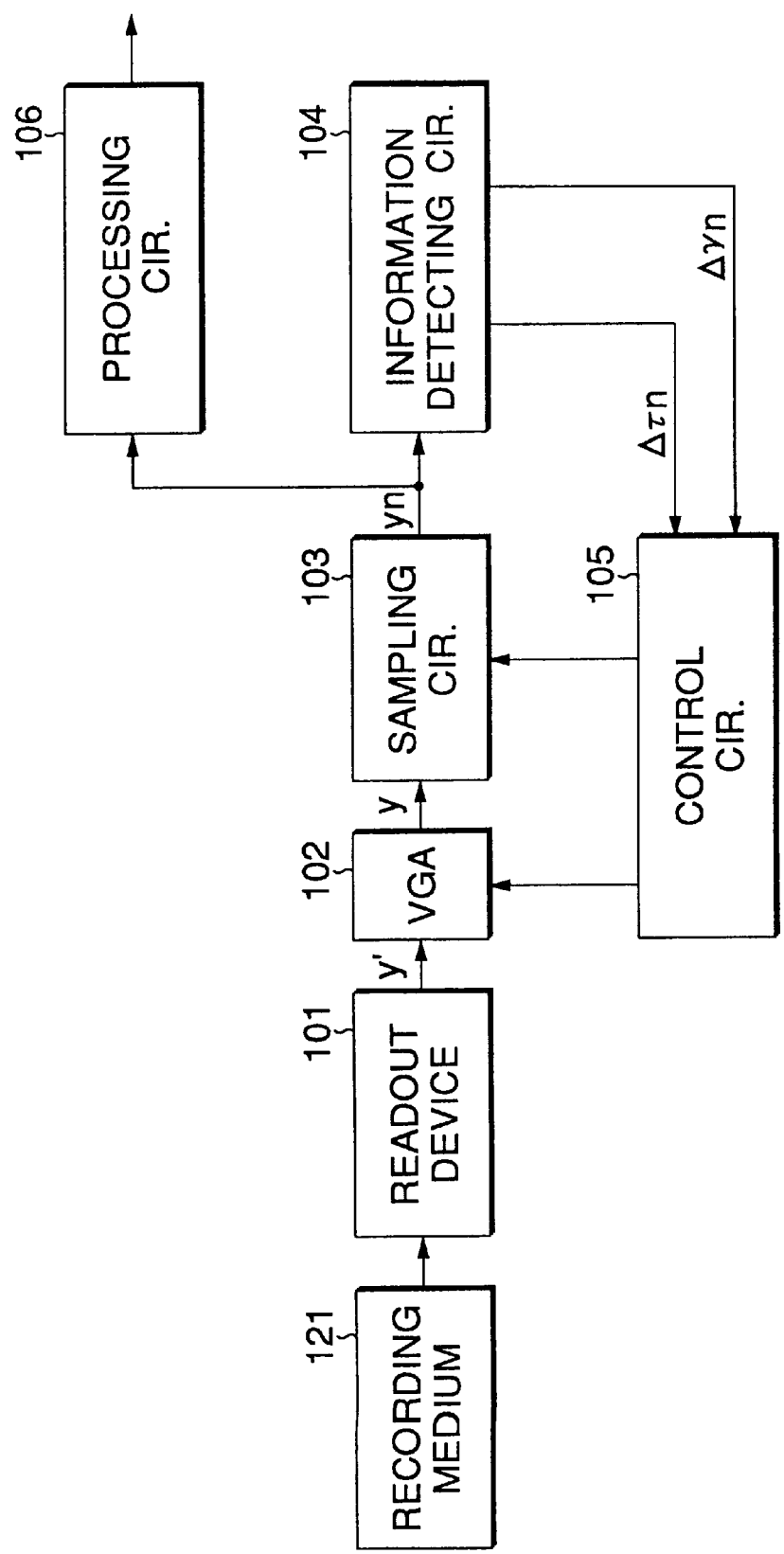
FIG. 2 is a block diagram showing an example of configuration of a reproduction apparatus to which an information detecting apparatus of the present invention is applied.

FIG. 2 shows an example of configuration of a reproduction apparatus to which an information detecting apparatus of the present invention is applied. A readout device 101 outputs an analog reproduction signal y' that corresponds to data recorded on a recording medium 121 to a VGA (variable gain amplifier) 102 (amplitude adjusting means). The readout device 101 outputs an analog signal that satisfies Nyquist's first criterion.

The VGA 102 amplifies the reproduction signal y' that is supplied from the readout device 101 at an amplification factor corresponding to a control signal that is supplied from a control circuit 105 (first control means, second control means), and outputs an amplified reproduction signal y to a sampling circuit 103 (sampling means).

The sampling circuit 103 adjusts the phase of a clock signal in accordance with a control signal that is supplied from the control circuit 105, samples the reproduction signal y in synchronism with the clock signal thus adjusted, and outputs sampled values $y_n$ to an information detecting circuit 104 and a processing circuit 106.

Using the sampled values $y_n$ that are supplied in synchronism with respective clocks, the information detecting circuit 104 calculates a phase error $\Delta\tau_n$ and a level error $\Delta\gamma_n$ of the reproduction signal and outputs those to the control circuit 105.

The control circuit 105 generates a control signal corresponding to the received phase error $\Delta\tau_n$ and outputs it to the sampling circuit 103. Further, the control circuit 105 generates a control signal corresponding to the received phase error $\Delta\gamma_n$ and outputs it to the VGA 102.

The sampling circuit 103, the information detecting circuit 104, and the control circuit 105 constitute a PLL, which adjusts the phase of the clock signal that is used for the sampling in accordance with the phase error.

The processing circuit 106 decodes the value $y_n$ that is supplied from the sampling circuit 104 and outputs decoded data to a predetermined circuit (not shown).

Figure 3:
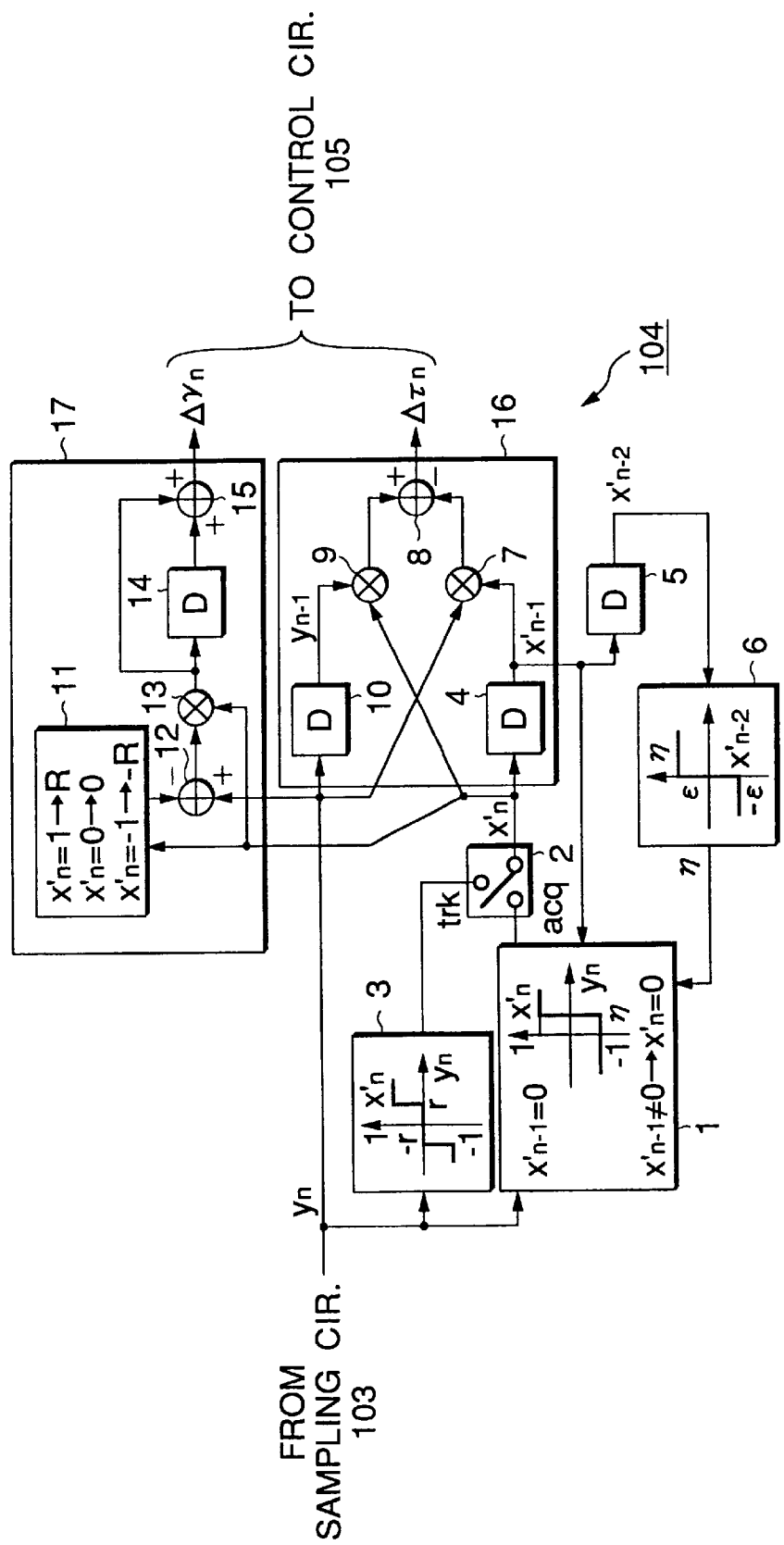
FIG. 3 is a block diagram showing an example of configuration of an information detecting circuit shown in FIG. 2.

FIG. 3 shows an example of configuration of the information detecting circuit 104 shown in FIG. 2. Where a prediction value $x'_{n-1}$ of a 1-clock preceding code is 0, a judgment circuit 1 (prediction value calculating means) outputs, to a switch 2 (selecting means), a value "1" as a prediction value $x'_n$ if a value $y_n$ of the reproduction signal sampled at time n is greater than or equal to a threshold value η that is supplied from a threshold value generating circuit 6 ($y_n \geq \eta$), and outputs a value "−1" as the prediction value $x'_n$ if $y_n < \eta$ (that is, a binary judgment is performed). Where the prediction value $x'_{n-1}$ of the 1-clock preceding code is not 0, the judgment circuit 1 outputs a value "0" as the prediction value $x'_n$.

A judgment circuit 3 (second prediction value calculating means, judging means) outputs, to the switch 2, a value "1" as a prediction value $x'_n$ if the value $y_n$ of the reproduction signal sampled at time n is greater than or equal to a positive threshold value r ($y_n \geq r$), outputs a value "−1" as the prediction value $x'_n$ if $y_n < -r$, and outputs a value "0" as the prediction value $x'_n$ if $-r \leq y_n < r$ (that is, a ternary judgment is performed).

The switch 2 outputs, to an operation circuit 16 (information calculating means) and an operation circuit 17 (information calculating means), the prediction value $x'_n$ that is output from the judgment circuit 1 while codes of a given pattern (a pattern for clock generation) that are located in the preamble section each sector of the recording medium (for instance, a rewritable optical disc), i.e., during an acquisition period. The switch 2 outputs the prediction value $x'_n$ that is output from the judgment circuit 3 while data that are recorded following the codes of the preamble section are thereafter reproduced, i.e., during a tracking period.

The operation circuit 16 calculates a phase error $\Delta\tau_n$ as phase information from the prediction value $x'_n$ that is supplied from the switch 2 and the reproduction signal value $y_n$ at time n, and outputs it to the control circuit 105.

To this end, in the operation circuit 16, a delay circuit 4 holds the prediction value $x'_n$ that is supplied from the switch 2 and outputs the prediction value $x'_n$ to a multiplier 7, a delay circuit 5, and the judgment circuit 1 at the next clock (time n+1).

The multiplier 7 calculates the product $y_{n-1} \cdot x'_n$ of the 1-clock preceding prediction value $x'_{n-1}$ that is supplied from the delay circuit 4 and the reproduction signal value $y_n$ at time n, and outputs a calculation result to a subtracter 8.

A delay circuit 10 holds the reproduction signal value $y_n$ at time n and outputs it to a multiplier 9 at the next clock (time n+1).

The multiplier 9 calculates the product $y_{n-1} \cdot x'_n$ of the 1-clock preceding reproduction signal value $y_{n-1}$ and the prediction value $x'_n$ at time n, and outputs a calculation result to the subtracter 8.

The subtracter 8 subtracts the value $y_n \cdot x'_{n-1}$ that is supplied from the multiplier 7 from the value $y_{n-1} \cdot x'_n$ that is supplied from the multiplier 9, and outputs a calculation result $y_{n-1} \cdot x'_n - y_n \cdot x'_{n-1}$ as a phase error $\Delta\tau_n$ at time n.

The operation circuit 17 calculates a level error $\Delta\gamma_n$ as level information from the prediction value $x'_n$ that is supplied from the switch 2 and the reproduction signal value $y_n$ at time n, and outputs it to the control circuit 105.

To this end, in the operation circuit 17, a conversion circuit 11 multiplies the prediction value $x'_n$ that is supplied from the switch 2 by the absolute value R of a peak value of the reproduction signal y, and outputs a calculation result $x'_n \cdot R$ to a subtracter 12 as a reproduction signal peak value $x''_n$ corresponding to the prediction value $x'_n$.

The subtracter 12 subtracts the value $x''_n$ that is supplied from the conversion circuit 11 from the reproduction signal value $y_n$ at time n, and outputs a calculation result $y_n - x''_n$ to a multiplier 13.

The multiplier 13 calculates the product $(y_n - x''_n) \cdot x'_n$ of the value $y_n - x''_n$ that is supplied from the subtracter 12 and the prediction value $x'_n$, and outputs a calculation result to a delay circuit 14 and an adder 15.

The delay circuit 14 holds the value $(y_n - x''_n) \cdot x'_n$ that is supplied from the multiplier 13 and outputs it to the adder 15 at the next clock (time n+1).

The adder 15 calculates the sum $(y_{n-1} - x''_{n-1}) \cdot x'_{n-1} + (y_n - x''_n) \cdot x'_n$ of the value $(y_n - x''_n) \cdot x'_n$ that is supplied from the multiplier 13 and the value $(y_{n-1} - x''_{n-1}) \cdot x'_{n-1}$ that is supplied from the delay circuit 14, and outputs a calculation result to the control circuit 105 as a level error $\Delta\gamma_n$ at time n.

The delay circuit 5 holds the value that is supplied from the delay circuit 4 and outputs it to the threshold value generating circuit 6 at the next clock.

The threshold value generating circuit 6 supplies, to the judgment circuit 1, a predetermined positive value ε as the threshold value η if the value supplied from the delay circuit 5 (2-clock-preceding prediction value $x'_{n-2}$) is 0 or more (0 or 1), and supplies a predetermined negative value −ε as the threshold value η if $x'_{n-2} < 0$ ($x'_{n-2} = -1$). When the 2-clock-preceding prediction value $x'_{n-2}$ is equal to 0, the threshold value generating circuit 6 may supply either the predetermined positive value or the predetermined negative value as the threshold value η, because the prediction value $x'_n$ is set at 0 by the judgment circuit 1 irrespective of the threshold value η. The threshold value generating circuit 6 of FIG. 3 is configured so as to supply the judgment circuit 1 with the predetermined positive value ε as the threshold value η.

Next, a description will be made of an operation of the reproduction apparatus of FIG. 2 in adjusting the amplification factor of the VGA 102 and the sampling phase of the sampling circuit 103 by utilizing a pattern {..., 0, 1, 0, −1, 0, ...} (4T pattern) having a period of 4 clocks that is recorded in each preamble section of the recording medium 121. The preamble section is located, for instance, at the head of each sector of the recording medium 121 and has codes of a given pattern to be used for synchronizing a data bit sequence with the clock signal. In the example under consideration, codes of a pattern {..., 0, 1, 0, −1, 0, ...} that has been generated, through conversion of a bit sequence {..., 0, 0, 1, 1, 0, 0, 1, 1, 1, ...} into NRZ (non-return-to-zero) modulation codes, by a precoder that generates codes of a partial response (1, 1) format are recorded in the preamble section.

First, the readout device 101 outputs, to the VGA 102, a reproduction signal y' that is read out from the recording medium 121.

The VGA 102 amplifies the reproduction signal y' that is supplied from the readout device 101 at an amplification factor corresponding to a control signal that is supplied from the control circuit 105. For example, the VGA 102 outputs an amplified reproduction signal y shown in FIG. 4A to the sampling circuit 103.

Figures 4A, 4B, 4C, 4D, 4E:
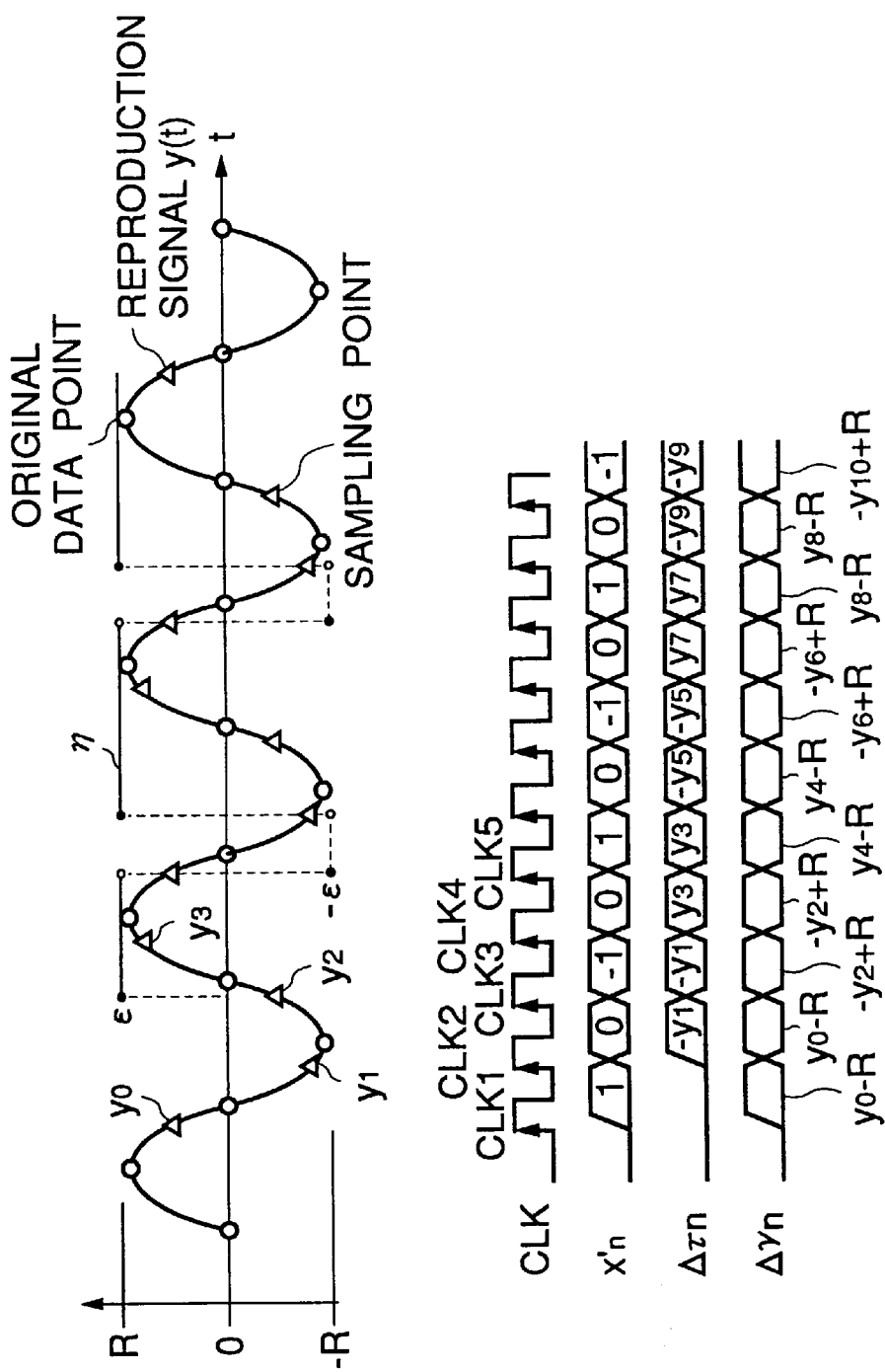
FIGS. 4A–4E are a timing chart illustrating an operation of the information detecting circuit of FIG. 3.

The sampling circuit 103 samples the reproduction signal y with a phase corresponding to a control signal that is supplied from the control circuit 105, for instance, in synchronism with a clock signal CLK shown in FIG. 4B, and outputs a sampled value $y_n$ to the information detecting circuit 104 and the processing circuit 106.

The information detecting circuit 104 calculates a phase error $\Delta\tau_n$ and a level error $\Delta\gamma_n$ of the reproduction signal, for instance, as shown in FIGS. 4D and 4E, respectively, by using the received value $y_n$, and outputs those to the control circuit 105 (described later).

The control circuit 105 generates a control signal corresponding to the phase error $\Delta\gamma_n$ that is supplied from the information detecting circuit 104 and outputs it to the sampling circuit. Further, the control circuit generates a control signal corresponding to the level error $\Delta\gamma_n$ that is supplied from the information detecting circuit 104 and outputs it to the VGA 102.

In the above manner, a phase error and a level error are detected from a sampled signal value $y_n$ and the sampling phase of the sampling circuit 103 and the amplification factor of the VGA 102 are adjusted in accordance with the phase error and the level error, respectively, whereby the rate of occurrence of errors in the processing of the processing circuit 106 can be reduced.

Next, the details of an operation of the information detecting circuit 104 in connection with the above-described operation will be described below.

First, the value $y_n$ that is supplied from the sampling circuit 103 is supplied to the judgment circuits 1 and 3 and the operation circuits 16 and 17.

The delay circuit 5 outputs, to the threshold value generating circuit 6, a value that was supplied from the delay circuit 4 at a 1-clock preceding time point, i.e., a 2-clock preceding prediction value $x'_{n-2}$.

The threshold value generating circuit 6 supplies, to the judgment circuit 1, the predetermined positive value ε as the threshold value η if the value $x'_{n-2}$ that is supplied from the delay circuit 5 is greater than or equal to 0, and supplies the predetermined negative value −ε as the threshold value η if $x'_{n-2} < 0$.

Since the threshold value η varies as time elapses as shown in FIG. 4A, the rate of occurrence of judgment errors in the judgment circuit 1 can be reduced. This type of judgment in which the threshold value is varied is called VTD (variable threshold decision).

Where a prediction value $x'_{n-1}$ of a 1-clock preceding code is 0, the judgment circuit 1 outputs, to the switch 2, a value "1" as a prediction value $x'_n$ if a reproduction signal value $y_n$ sampled at time n is greater than or equal to the threshold value η that is supplied from the threshold value generating circuit 6 ($y_n \geq \eta$), and outputs a value "−1" as the prediction value $x'_n$ if $y_n < \eta$. Where the prediction value $x'_{n-1}$ of a 1-clock preceding code is not 0, the judgment circuit 1 outputs a value "0" as the prediction value $x'_n$.

That is, where the prediction value $x'_{n-1}$ of the 1-clock preceding code is 0, the judgment circuit 1 performs a binary judgment on the code concerned and sets the prediction value $x'_n$ at 1 or −1.

During the interval between the first two clocks (n=0, 1), the threshold value generating circuit 6 is not supplied with any value from the delay circuit 5 and hence the judgment circuit 1 calculates a prediction value $x'_n$ with the threshold value η regarded as 0.

Therefore, at CLK1 (n=0) in FIG. 4B, the judgment circuit 1 calculates a prediction value $x'_n$ with the threshold value η regarded as 0. At this time, since a reproduction signal value $y_0$ is positive as shown in FIG. 4A, the judgment circuit 1 outputs a value "1" as a prediction value $x'_0$ as shown in FIG. 4C. At CLK2 (n=1) in FIG. 4B, since the 1-clock preceding prediction value $x'_0$ is 1, the judgment circuit 1 outputs a value "0" as a prediction value $x'_1$ at CLK2.

At CLK3 (n=2) in FIG. 4B, since the 2-clock preceding prediction value $x'_0$ is 1, the threshold value η is set at the positive value ε. At this time, since a reproduction signal value $y_2$ is smaller than the positive value ε, the judgment circuit 1 outputs a value "−1" as a prediction value $x'_2$ at CLK3.

At CLK4 (n=3) in FIG. 4B, since the 1-clock preceding prediction value $x'_2$ is −1, the judgment circuit 1 outputs a value "0" as a prediction value $x'_3$ at CLK 4. At CLK5 (n=4) in FIG. 4B, since the 2-clock preceding prediction value $x'_2$ is −1, the threshold value η is set at the negative value −ε. At this time, since a reproduction signal value $y_4$ is larger than the negative value −ε, the judgment circuit 1 outputs a value "1" as a prediction value $x'_4$ at CLK5.

In the above manner, the judgment circuit 1 calculates prediction values $x'_n$ on a clock-by-clock basis.

Now, with an assumption that codes of a given pattern that are located in a preamble section are being reproduced, the switch 2 outputs, to the operation circuits 16 and 17, the prediction value $x'_n$ that is supplied from the judgment circuit 1.

The operation circuit 16 calculates a phase error $\Delta\tau_n$ as phase information from the prediction value $x'_n$ that is supplied from the switch 2 and the reproduction signal value $y_n$ at time n (and the values $x'_{n-1}$ and $y_{n-1}$ at time n−1), and outputs it.

At this time, in the operation circuit 16, a delay circuit 4 outputs, to the multiplier 7, the delay circuit 5, and the judgment circuit 1, the prediction value $x'_{n-1}$ that was supplied from the switch 2 at the 1-clock preceding time point. The multiplier 7 calculates the product $y_n \cdot x'_{n-1}$ of the 1-clock preceding prediction value $x'_{n-1}$ that is supplied from the delay circuit 4 and the reproduction signal value $y_n$ at time n, and outputs a calculation result to the subtracter 8.

The delay circuit 10 outputs the reproduction signal value $y_n$ at time n−1 to the multiplier 9. The multiplier 9 calculates the product $y_{n-1} \cdot x'_n$ of the 1-clock preceding reproduction signal value $y_{n-1}$ that is supplied from the delay circuit 10 and the prediction value $x'_n$ at time n, and outputs a calculation result to the subtracter 8.

The initial values of the delay circuits 4 and 10 are set at 0.

The subtracter 8 subtracts the value $y_n \cdot x'_{n-1}$ that is supplied from the multiplier 7 from the value $y_{n-1} \cdot x'_n$ that is supplied from the multiplier 9, and outputs a calculation result $y_{n-1} \cdot x'_n - y_n \cdot x'_{n-1}$ to the control circuit 105 as a phase error $\Delta\tau_n$ at time n.

For example, at CLK2 (n=1) in FIG. 4B, since the prediction value $x'_n$ is 0 and the 1-clock preceding prediction value $x'_{n-1}$ is 1, a value $-y_1$ ($=y_{n-1} \cdot 0 - y_n \cdot 1$) is output as the phase error $\Delta\tau_n$ as shown in FIG. 4D. At CLK3 (n=2) in FIG. 4B, since the prediction value $x'_n$ is −1 and the 1-clock preceding prediction value $x'_{n-1}$ is 0, a value $-y_1$ ($=y_{n-1} \cdot (-1) - y_n \cdot 0$) is output as the phase error $\Delta\tau_n$. At CLK4 (n=3) in FIG. 4B, since the prediction value $x'_n$ is 0 and the 1-clock preceding prediction value $x'_{n-1}$ is −1, a value $y_3$ ($=y_{n-1} \cdot 0 - y_n \cdot (-1)$) is output as the phase error $\Delta\tau_n$. At CLK5 (n=4) in FIG. 4B, since the prediction value $x'_n$ is 1 and the 1-clock preceding prediction value $x'_{n-1}$ is 0, a value $y_3$ ($=y_{n-1} \cdot 1 - y_n \cdot 0$) is output as the phase error $\Delta\tau_n$.

The operation circuit 16 sequentially calculates phase errors $\Delta\tau_n$ in the above manner.

On the other hand, the operation circuit 17 calculates a second-order-series level error $\Delta\gamma_n$ as level information from the prediction value $x'_n$ that is supplied from the switch 2 and the reproduction signal value $y_n$ at time n, and outputs it. The level error $\Delta\gamma_n$ is the sum of the difference $y_n - x''_n$ between the signal value and the target peak value at time n and the difference $y_{n-1} - x''_{n-1}$ between the signal value and the target peak value at time n−1.

At this time, in the operation circuit 17, the conversion circuit 11 multiplies the prediction value $x'_n$ that is supplied from the switch 2 by the absolute value R of the peak value (target value) of the reproduction signal y, and outputs a calculation result $x''_n$ ($=x'_n \cdot R$) to the subtracter 12.

The subtracter 12 subtracts the value $x''_n$ that is supplied from the conversion circuit 11 from the reproduction signal value $y_n$ at time n, and outputs a calculation result $y_n - x''_n$ to the multiplier 13.

The multiplier 13 calculates the product $(y_n - x''_n) \cdot x'_n$ of the value $y_n - x''_n$ that is supplied from the subtracter 12 and the prediction value $x'_n$, and outputs a calculation result to the delay circuit 14 and the adder 15.

The delay circuit 14 outputs the value $(y_{n-1} - x''_{n-1}) \cdot x'_{n-1}$ that was supplied from the multiplier 13 at a 1-clock preceding time point, and outputs it to the adder 15. The initial value of the delay circuit 14 is set at 0.

The adder 15 calculates the sum $(y_{n-1} - x''_{n-1}) \cdot x'_{n-1} + (y_n - x''_n) \cdot x'_n$ of the value $(y_n - x''_n) \cdot x'_n$ that is supplied from the multiplier 13 and the value $(y_{n-1} - x''_{n-1}) \cdot x'_{n-1}$ that is supplied from the delay circuit 14, and outputs a calculation result to the control circuit 105 as the level error $\Delta\gamma_n$ at time n. For example, at CLK1 (n=0) at FIG. 4B, if the 1-clock preceding prediction value $x'_{n-1}$ has the initial value 0, since the prediction value $x'_n$ is 1, $y_0 - R$ ($=y_n - x''_n = (y_{n-1} - x''_{n-1}) \cdot 0 + (y_n - x''_n) \cdot 1$) is output as the level error $\Delta\gamma_n$ as shown in FIG. 4E. At CLK2 (n=1) in FIG. 4B, since the prediction value $x'_n$ is 0 and the 1-clock preceding prediction value $x'_{n-1}$ is 1, $y_0 - R$ ($=y_{n-1} - x''_{n-1} = (y_{n-1} - x''_{n-1}) \cdot 1 + (y_n - x''_n) \cdot 0$) is output as the level error $\Delta\gamma_n$.

At CLK3 (n=2) in FIG. 4B, since the prediction value $x'_n$ is −1 and the 1-clock preceding prediction value $x'_{n-1}$ is 0, $-y_2 + R$ ($=-(y_n - x''_n) = (y_{n-1} - x''_{n-1}) \cdot 0 + (y_n - x''_n) \cdot (-1)$) is output as the level error $\Delta\gamma_n$.

At CLK4 (n=3) in FIG. 4B, since the prediction value $x'_n$ is 0 and the 1-clock preceding prediction value $x'_{n-1}$ is −1, $-y_2 + R$ ($=-(y_{n-1} - x''_{n-1}) = (y_{n-1} - x''_{n-1}) \cdot (-1) + (y_n - x''_n) \cdot 0$) is output as the level error $\Delta\gamma_n$. At CLK5 (n=4) in FIG. 4B, since the prediction value $x'_n$ is 1 and the 1-clock preceding prediction value $x'_{n-1}$ is 0, $y_4 - R$ ($=y_n - x''_n = (y_{n-1} - x''_{n-1}) \cdot 0 + (y_n - x''_n) \cdot 1$) is output as the level error $\Delta\gamma_n$.

The operation circuit 17 sequentially calculates level errors $\Delta\gamma_n$ in the above manner.

The information detecting circuit 104 detects the phase error $\Delta\tau_n$ and the level error $\Delta\gamma_n$ in the above-described manner. The rate of occurrence of judgment errors can be reduced by setting, in the judgment circuit 1, the prediction value $x'_n$ at 0 every other clock in accordance with the code pattern $\{\ldots, 0, 1, 0, -1, 0, \ldots\}$.

On the other hand, where codes in a region other than the preamble sections are being reproduced, the prediction value $x'_n$ that is supplied from the judgment circuit 3 is output to the operation circuits 16 and 17.

The judgment circuit 3 outputs, to the switch 2, a value "1" as the prediction value $x'_n$ if the reproduction signal value $y_n$ sampled at time n is greater than or equal to the positive threshold value r ($y_n \geq r$), outputs a value "−1" as the prediction value $x'_n$ if $y_n < -r$, and outputs a value "0" as the prediction value $x'_n$ if $-r \leq y_n < r$. That is, a ternary judgment is performed.

Subsequently, the operation circuits 16 and 17 operate in the same manner as in reproducing a preamble section. Since the phase and level adjustments are performed during reproduction of a preamble section in the above-described manner, the rate of occurrence of judgment errors during reproduction of a data section can be reduced.

Figure 1:
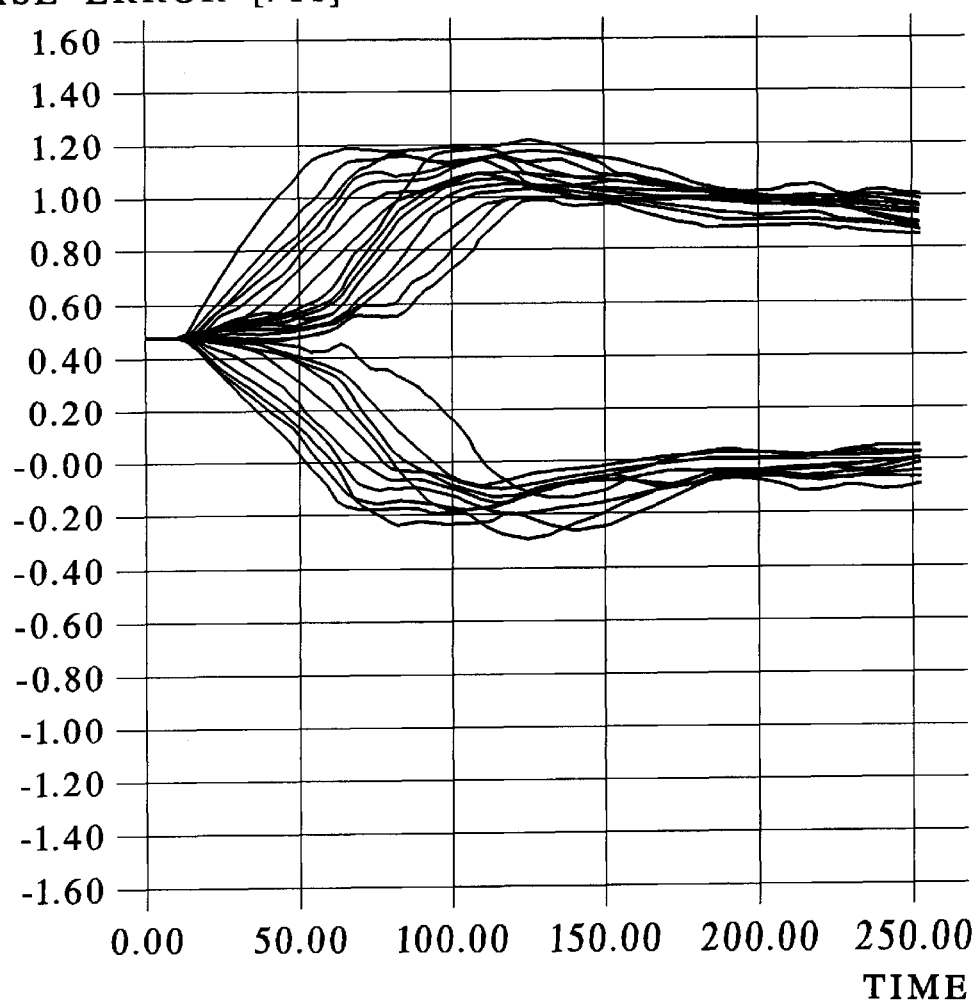
FIG. 1 shows an example of a manner of convergence of the phase error at the occurrence of a judgment error in a conventional case.
Figure 5:
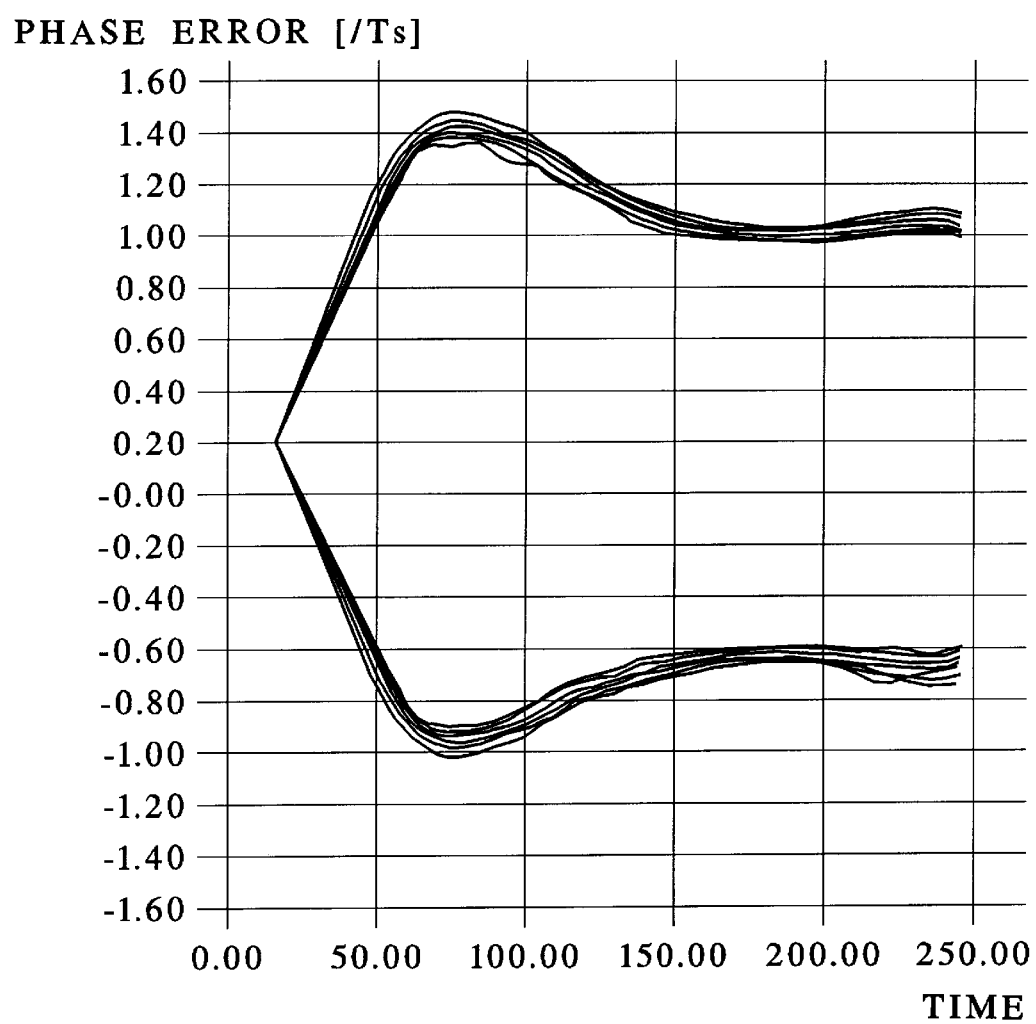
FIG. 5 shows an example of a manner of convergence of the phase error at the occurrence of a judgment error in a case where the information detecting circuit of FIG. 3 is used.

FIG. 5 shows an example of a manner of convergence of the phase error at the occurrence of a judgment error in a case where the information detecting circuit 104 is used. In this manner, by using the information detecting circuit 104, as compared to the case of FIG. 1, the rate of occurrence of judgment errors can be made lower and the phase error can be V converged to an integer period (in the case of FIG. 5, a 1 period or a −1 period) more quickly.

Figure 6:
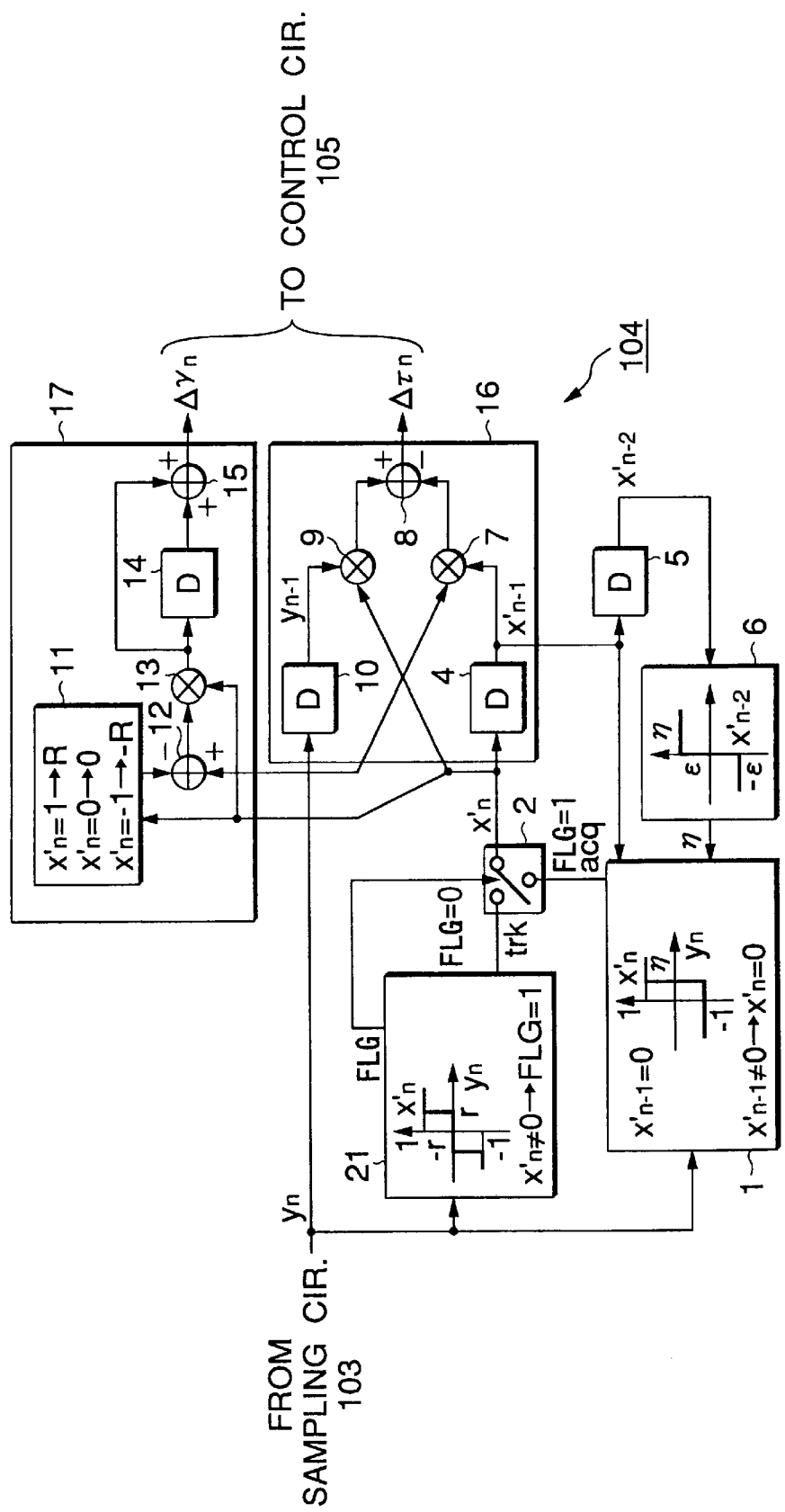
FIG. 6 is a block diagram showing another example of configuration of the information detecting circuit of FIG. 2.

FIG. 6 shows an example of configuration of the information detecting apparatus 104. This information detecting apparatus 104 is one obtained by replacing the judgment circuit 3 of the information detecting circuit 104 of FIG. 3 with a judgment circuit 21 (second prediction value calculating means, judgment means), and hence only the judgment circuit 21 will be described below.

Like the judgment circuit 3, the judgment circuit 21 outputs a value "1," "0," or "−1" as the prediction value $x'_n$ to the switch 2 in accordance with the received value $y_n$. Further, while a preamble section is reproduced, the judgment circuit 21 outputs a value "0" as a flag signal FLG to the switch until the prediction value $x'_n$ first becomes a non-zero value (i.e., 1 or −1). After the prediction value $x'_n$ has become 1 or −1, the judgment circuit 21 continuously outputs a value "1" as the flag signal FLG to the switch 2 until the end of the preamble section. After the reproduction of the preamble section has finished, the judgment circuit 21 continuously outputs a value "0" as the flag signal FLG to the switch 2 during reproduction of the next data section.

The switch 2 selects the prediction value that is supplied from the judgment circuit 1 if the value of the flag signal FLG is 1, and selects the prediction value that is supplied from the judgment circuit 21 if the value of the flag signal FLG is 0.

With this configuration, since a waiting state is maintained until a code is first judged to be a non-zero value, the detection period is shortened to realize a high-speed following operation.

Figure 7:
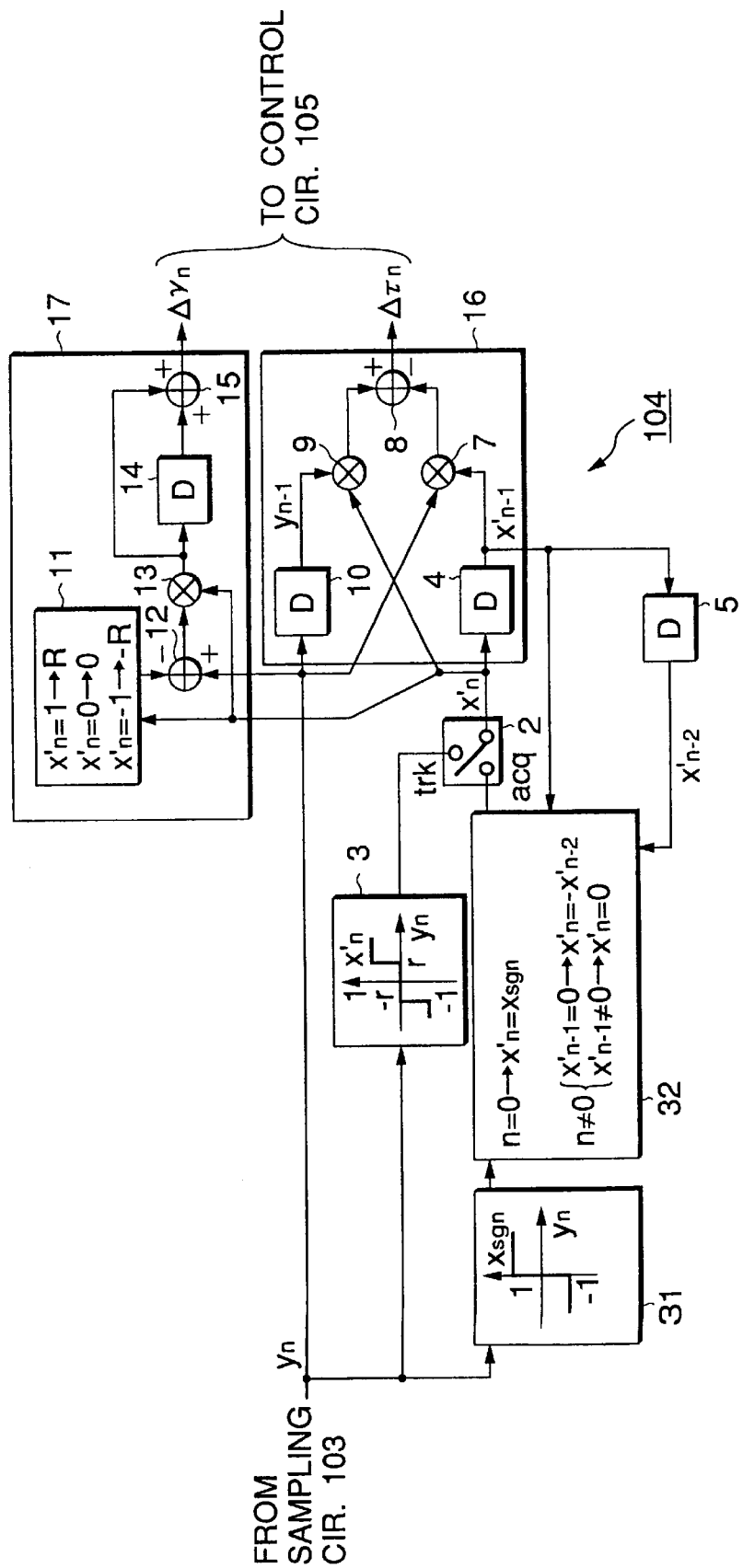
FIG. 7 is a block diagram showing another example of configuration of the information detecting circuit of FIG. 2.

FIG. 7 shows another example of configuration of the information detecting circuit 104. This information detecting circuit 104 is one obtained by omitting the threshold value generating circuit 6 of the information detecting circuit 104 of FIG. 3 and replacing the judgment circuit 1 of the information detecting circuit 104 of FIG. 3 with a comparator 31 and a judgment circuit 32. Therefore, only the comparator 31 and the judgment circuit 32 will be described below.

The comparator 31 outputs a value "1" if the sampled reproduction signal value $y_n$ is greater than or equal to 0, and outputs a value "−1" in the other cases ($y_n<0$). That is, a binary judgment is performed.

Where the time n is 0 (n=0), the judgment circuit 32 outputs, to the switch 2, as the prediction value $x'_n$, a value $x_{sgn}$ that is supplied from the comparator 31. In the other cases (n>0), the judgment circuit 32 outputs, as the prediction value $x'_n$, a value $-x'_{n-2}$ that is obtained by inverting the sign of the 2-clock preceding prediction value $x'_{n-2}$ that is supplied from the delay circuit 5 if the 1-clock preceding prediction value $x'_{n-1}$ is 0. If the 1-clock preceding prediction value $x'_{n-1}$ is not 0, the judgment circuit 32 outputs a value "0" as the prediction value $x'_n$.

As described above, while codes having a pattern { . . . , 0, 1, 0, −1, 0, . . . } (i.e., a preamble section) are reproduced, if it is known that the value of the first code is 1 or −1, the values of the ensuing codes can be set sequentially irrespective of the value $y_n$. With this configuration, since actually no judgment is performed while n≠0, the rate of occurrence of judgment errors can be reduced.

Figure 8:
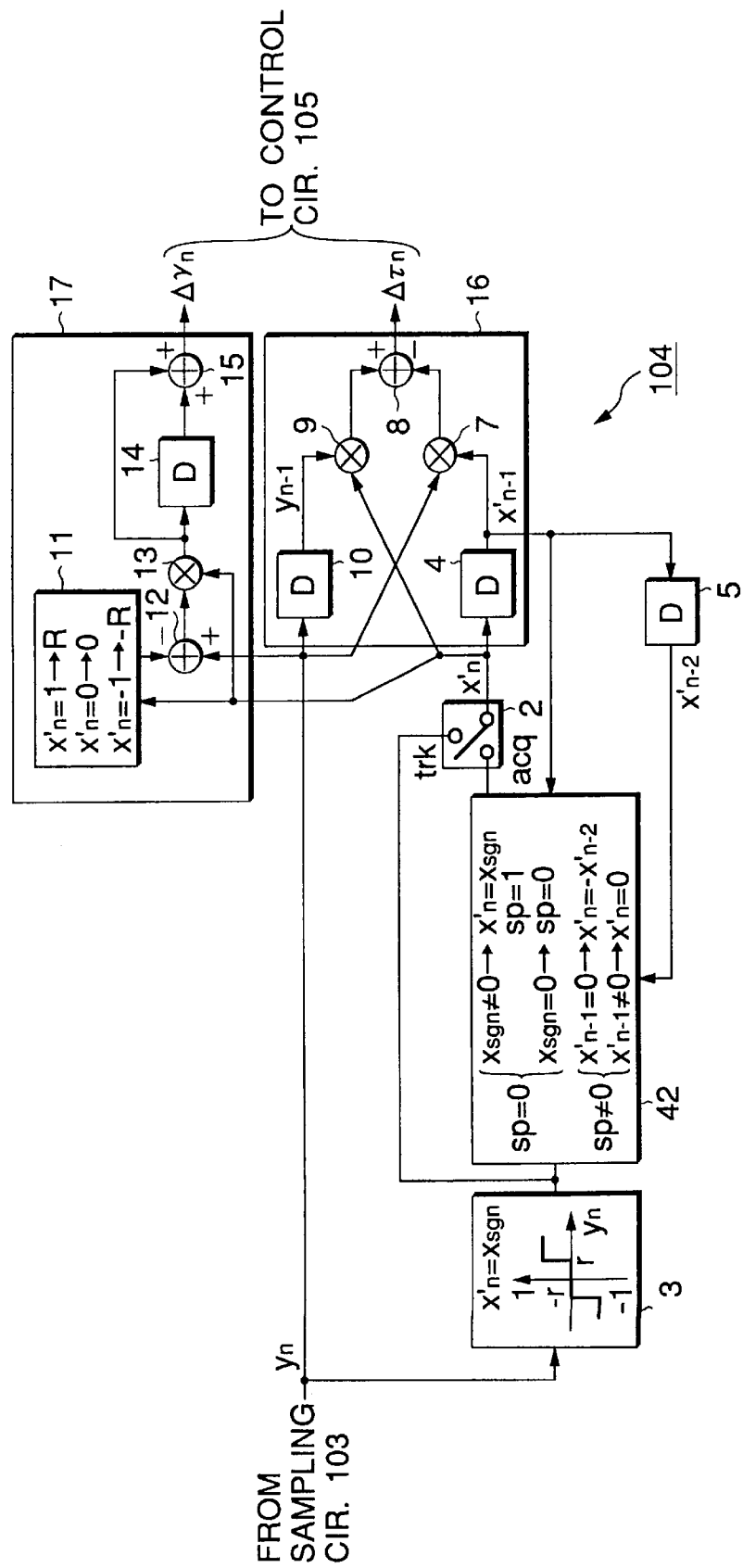
FIG. 8 is a block diagram showing a further example of configuration of the information detecting circuit of FIG. 2.

FIG. 8 shows a further example of configuration of the information detecting circuit 104. This information detecting circuit 104 is one obtained by omitting the comparator 31 of the information detecting circuit 104 of FIG. 7 and employing a judgment circuit 42 (prediction value calculating means) instead of the judgment circuit 32 of the information detecting circuit 104 of FIG. 7. Therefore, only the judgment circuit 42 will be described below.

The judgment circuit 42 holds a state variable sp. The initial value of the state variable sp is set at 0. Thereafter, where sp is equal to 0, if a value $x'_n$ ($=x_{sgn}$) that is supplied from the judgment circuit 3 is not equal to 0, the judgment circuit 42 outputs the value $x_{sgn}$ to the switch 2 as a prediction value $x'_n$ and then sets the value of sp at 1. If the value $x_{sgn}$ that is supplied from the judgment circuit 3 is equal to 0, the judgment circuit 42 performs no operation. Where sp is not equal to 0, if the 1-clock preceding prediction value $x'_{n-1}$ is 0, the judgment circuit 42 outputs, as the prediction value $x'_n$, a value $-x'_{n-2}$ that is obtained by inverting the sign of the 2-clock preceding prediction value $x'_{n-2}$. If the 1-clock preceding prediction value $x'_{n-1}$ is not 0, the judgment circuit 42 outputs a value "0" as the prediction value $x'_n$.

With this configuration, while a preamble section is reproduced, a waiting state is maintained until the judgment circuit 3 first judges that the prediction value is equal to 1 or −1. Therefore, the rate occurrence of judgment errors when n≠0 can be reduced. Further, the detection period is shortened to realize an even faster following operation.

FIGS. 9A–9E show examples of the phase error $\Delta\tau_n$ and the level error $\Delta\gamma_n$ that occur with the example of configuration of FIG. 8 in a case where a code is first judged to be 0 and the next code is judged to be −1.

Figure 10:
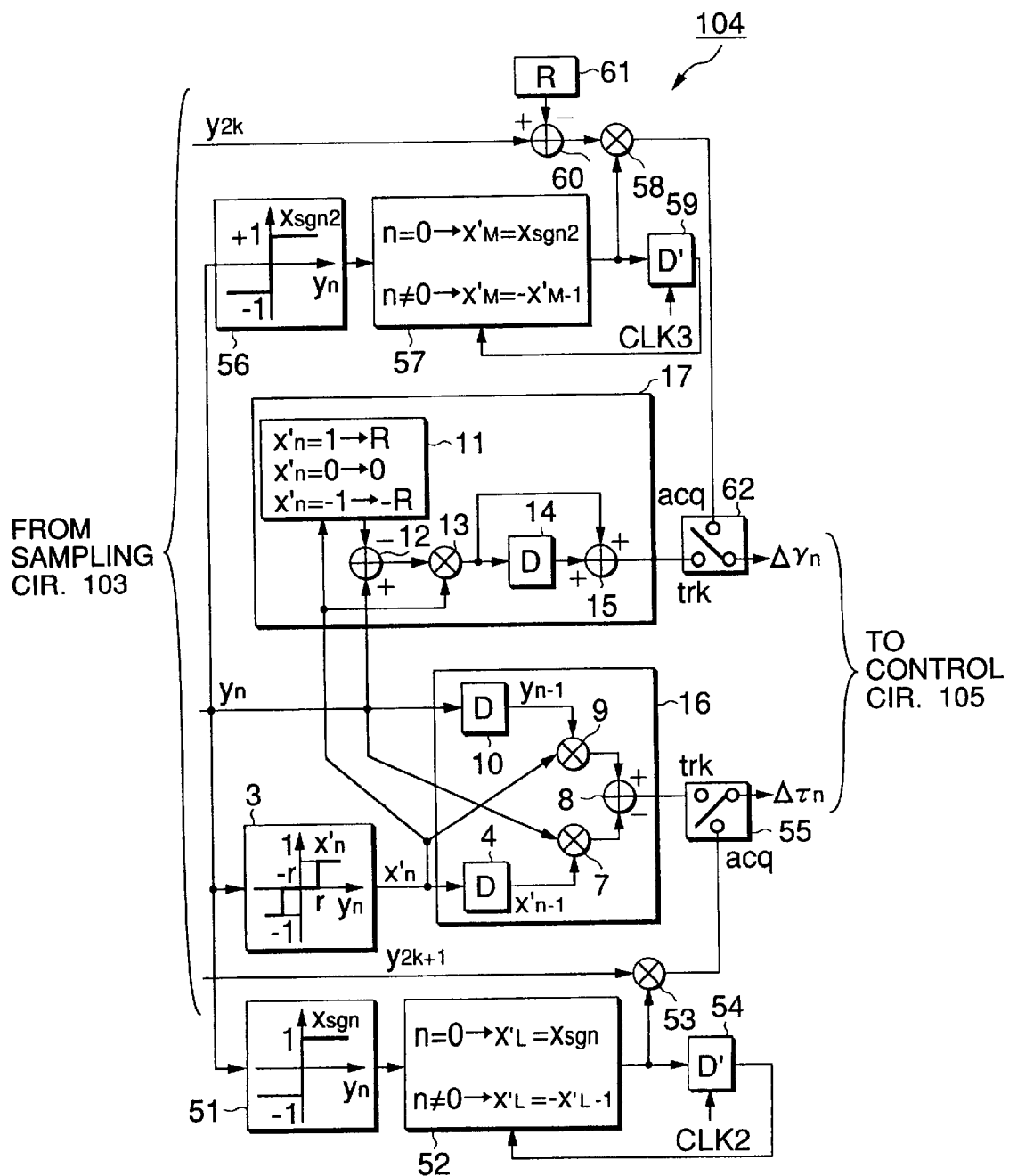
FIG. 10 is a block diagram showing another example of configuration of the information detecting circuit of FIG. 2.

FIG. 10 shows another example of configuration of the information detecting circuit 104. In this information detecting circuit 104, a judgment circuit 3 outputs one of three values "1,", "0," and "−1" in accordance with the sampled reproduction signal value $y_n$ and outputs it to operation circuits 16 and 17. That is, a ternary judgment is performed.

The operation circuit 16 calculates a value $y_{n-1} \cdot x'_n - y_n \cdot x'_{n-1}$ from the sampled reproduction signal value $y_n$ and the prediction value $x'_n$ that is supplied from the judgment circuit 3, and outputs it to a switch 55 (selecting means).

The operation circuit 17 calculates a value $(y_{n-1}-x''_{n-1}) \cdot x'_{n-1}+(y_n-x''_n) \cdot x'_n$ from the sampled reproduction signal value $y_n$ and the prediction value $x'_n$ that is supplied from the judgment circuit 3, and outputs it to a switch 62 (selecting means).

A comparator 51 outputs a value "1" to a judgment circuit 52 (prediction value calculating means) if the sampled reproduction signal value $y_n$ is greater than or equal to 0, and output a value "−1" if $y_n<0$. That is, a binary judgment is performed.

The judgment circuit 52 outputs, to a multiplier 53 and a delay circuit 54, as a prediction value $x'_L$, the value $x_{sgn}$ that is supplied from the comparator 51 if the time n is equal to 0, and outputs, as the prediction value $x'_L$, a value $-x'_{L-1}$ that is obtained by inverting the sign of a value that is supplied from the delay circuit 54 if the time n is not equal to 0.

The multiplier 53 calculates the product $y_{2k+1} \cdot x'_L$ of a reproduction signal value $y_{2k+1}$ sampled at an odd-numbered time ((2k+1)th time) and the prediction value $x'_L$ that is supplied from the judgment circuit 52, and outputs a calculation result to the switch 55.

Operating on a clock signal CLK2 (see FIG. 11F) whose period is two times that of a clock signal CLK (see FIG. 11B) for the sampling, the delay circuit 54 holds the prediction value $x'_L$ that is supplied from the judgment circuit 52 and outputs it to the judgment circuit 52 at the next clock.

While codes of a given pattern that are located in a preamble section of the recording medium 121 are reproduced, the switch 55 outputs, to the control circuit 105, as the phase error $\Delta\tau_n$, the value $y_{2k+1} \cdot x'_L$ that is supplied from the multiplier 53. Thereafter, during reproduction of data, the switch 55 outputs the phase error $\Delta\tau_n$ that is supplied from the operation circuit 16.

A comparator 56 outputs a value "1" to a judgment circuit 57 (prediction value calculating means) if the sampled reproduction signal value y, is greater than or equal to 0, and outputs a value "−1" if $y_n<0$. That is, a binary judgment is performed.

The judgment circuit 57 outputs, to a multiplier 58 and a delay circuit 59, as a prediction value $x'_M$, a value $x_{sgn2}$ that is supplied from the comparator 56 when the time n is equal to 0, and outputs, as the prediction value $x'_M$, a value $-x'_{M-1}$ that is obtained by inverting the sign of the value that is supplied from the comparator 56 when the time n is not equal to 0.

A subtracter 60 subtracts the absolute value R of a reproduction signal peak value that is supplied from a constant generating circuit 61 from a reproduction signal value $y_{2k}$ sampled at an even-numbered time (2kth time), and outputs a calculation result $y_{2k}-R$ to the multiplier 58.

The multiplier 58 calculates the product $(y_{2k}-R) \cdot x'_M$ of the value $y_{2k}-R$ that is supplied from the subtracter 60 and the prediction value $x'_M$ that is supplied from the judgment circuit 57, and outputs a calculation result to the switch 62.

Operating on a clock signal CLK3 (see FIG. 11I) whose period is two times that of the clock signal CLK (see FIG. 11B) for the sampling and whose phase is deviated from that of the clock signal CLK2 by a half period, the delay circuit 59 holds the prediction value $x'_M$ that is supplied from the judgment circuit 57 and outputs it to the judgment circuit 57 at the next clock.

While codes of a given pattern that are located in a preamble section of the recording medium 121 are reproduced, the switch 62 outputs, to the control circuit 105, as the level error $\Delta\gamma_n$, the value $(y_{2k}-R) \cdot x'_M$ that is supplied from the multiplier 58. Thereafter, during reproduction of data, the switch 62 outputs the level error $\Delta\gamma_n$ that is supplied from the operation circuit 17.

Figure 11:
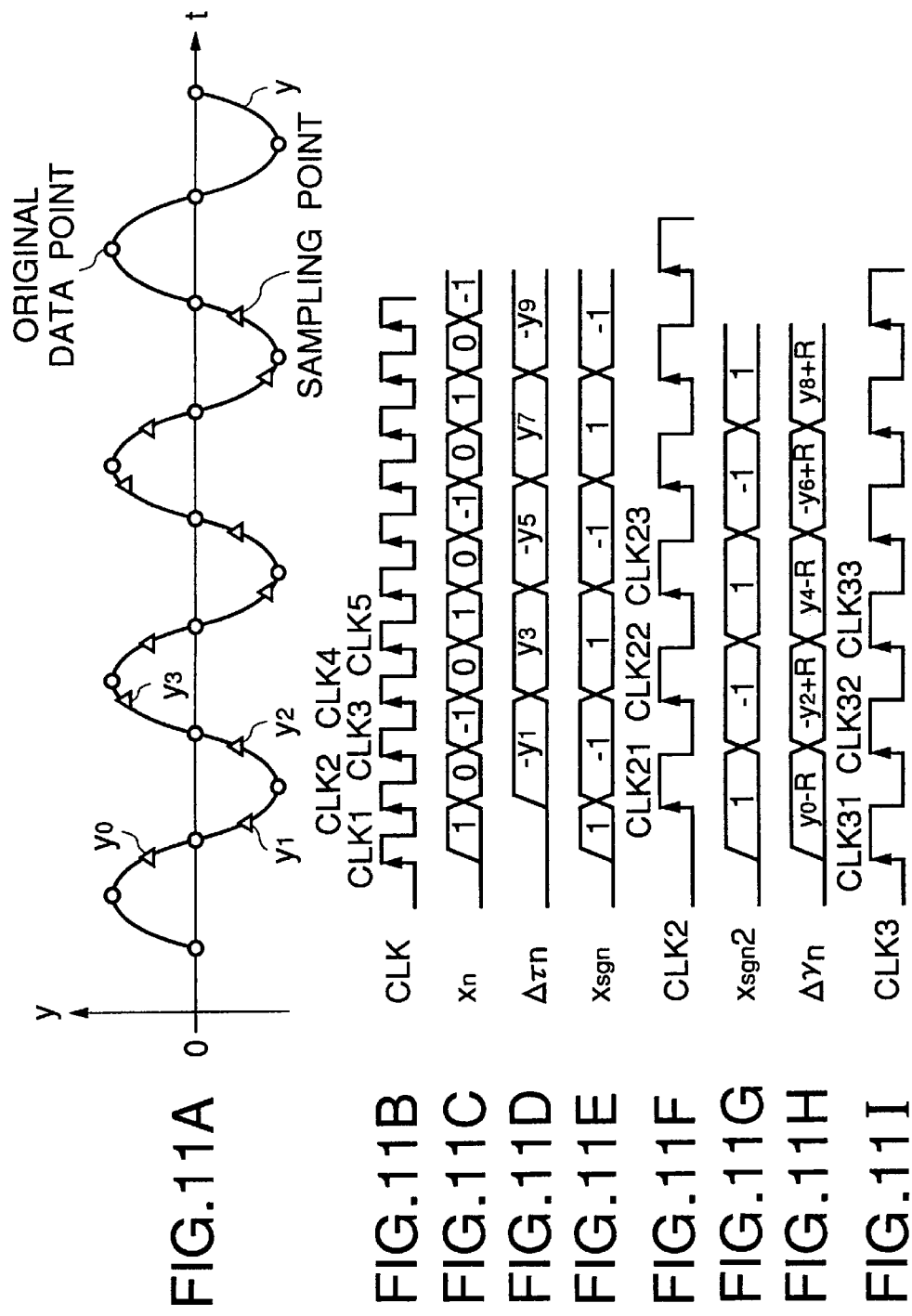
FIGS. 11A–11I are a timing chart illustrating an operation of the information detecting circuit of FIG. 10.

For example, where sampled values $y_n$ of a reproduction signal y corresponding to the above-mentioned pattern $\{\ldots, 0, 1, 0, -1, 0, \ldots\}$ are supplied as shown in FIG. 11A, the information detecting circuit 104 outputs phase errors $\Delta\tau_n$ shown in FIG. 11D and level errors $\Delta\gamma_n$ shown in FIG. 11H to the control circuit 105. Values $x_n$ shown in FIG. 11C are not prediction values but values of data corresponding to the sampled values. That is, the values $x_n$ are not used for the calculation of phase errors $\Delta\tau_n$ and level errors $\Delta\gamma_n$.

At CLK1 (n=0) in FIG. 11B, since $y_n$ is a positive value as shown in FIG. 11A, the comparator 51 outputs a value "1" as $x_{sgn}$. At CLK2 (n =1) in FIG. 11B, i.e., at CLK21 (k=0) in FIG. 11F, since the judgment circuit 52 outputs a value "−1" that is obtained by inverting the sign of the initial value 1 of the delay circuit 54, $-y_1$ (=$y_{2k+1} \cdot (-1)$) is output as a phase error $\Delta\tau_n$ as shown in FIG. 11D. At CLK22 (k=1) in FIG. 11F, i.e., at CLK4 (n=3) in FIG. 11B, since the judgment circuit 52 outputs a value "1" that is obtained by inverting the sign of a value "−1" that is a 1-clock preceding prediction value $x'_{L-1}$, $y_3$ (=$y_{2k+1} \cdot 1$) is output as a phase error $\Delta\tau_n$.

On the other hand, at CLK1 (n=0) in FIG. 11B, i.e., at CLK31 (k=0) in FIG. 11I, since $y_n$ is a positive value as shown in FIG. 11A, the comparator 56 outputs a value "1" as $X_{sgn2}$. At this time, $y_0-R$ (=$(y_{2k}-R) \cdot 1$ is output as a level error $\Delta\gamma_n$ as shown in FIG. 11H. At CLK32 (k=1) in FIG. 11I, i.e., at CLK3 (n=2) in FIG. 11B, since the judgment circuit 57 outputs a value "−1" obtained by inverting the sign of "1" that is a 1-clock preceding prediction value $x'_{M-1}$, $-y_2-R$ (=$(y_{2k}-R) \cdot (-1)$) is output as a level error $\Delta\gamma_n$. At CLK33 (k=2) in FIG. 11I, i.e., at CLK5 (n=4) in FIG. 11B, since the judgment circuit 57 outputs a value "1" obtained by inverting the sign of "−1" that is a 1-clock preceding prediction value $x'_{M-1}$, $y_4-R$ (=$(y_{2k}-R) \cdot 1$) is output as a level error $\Delta\gamma_n$.

With the above configuration, the circuits for calculating the phase error $\Delta\tau_n$ and the level error $\Delta\gamma_n$ from the sampled value $y_n$ of the reproduction signal y that corresponds to the above-mentioned pattern $\{\ldots, 0, 1, 0, -1, 0, \ldots\}$ operate on the clock signals CLK2 and CLK3 whose period is two times that of the sampling clock signal CLK. Therefore, a low-speed, low-power-consumption information detecting circuit can be constructed.

Figure 12:
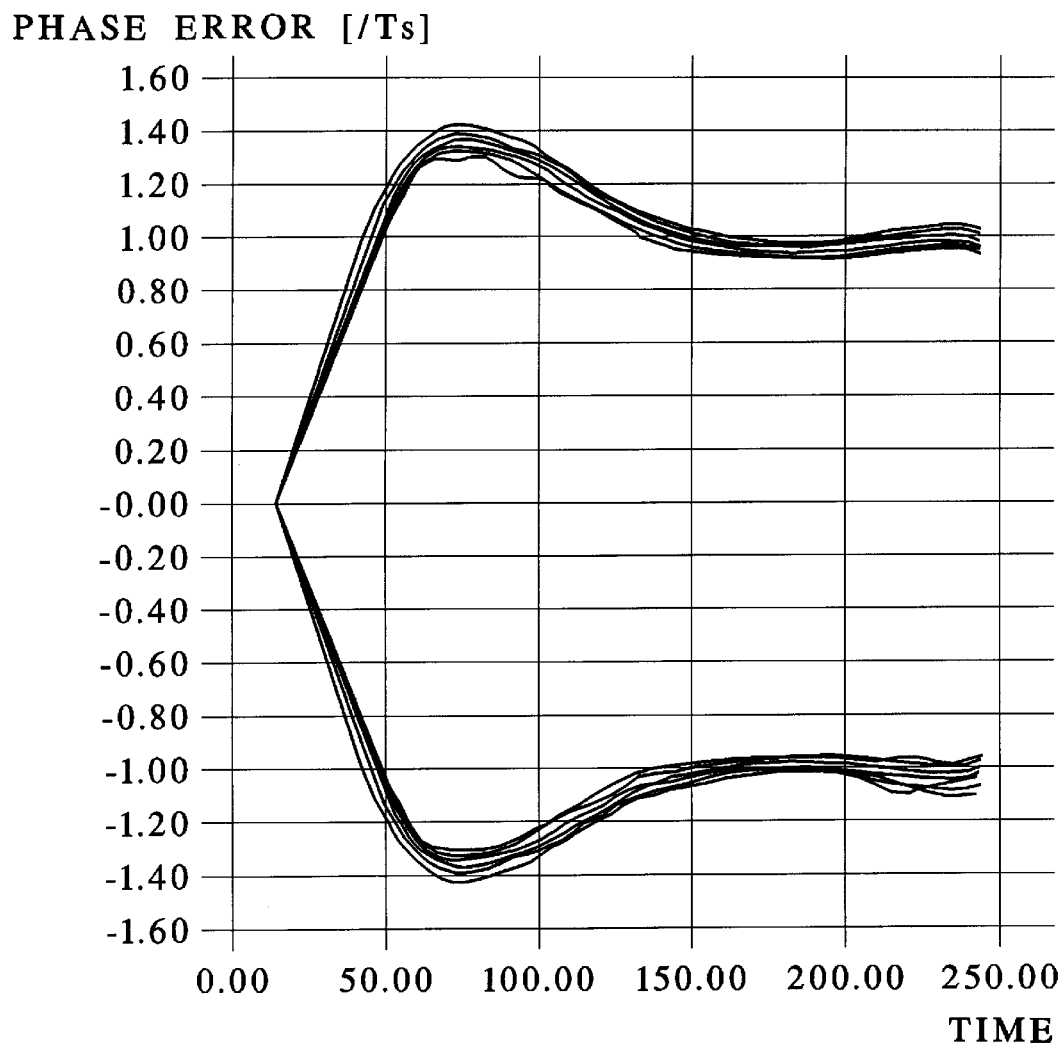
FIG. 12 shows an example of a manner of convergence of the phase error at the occurrence of a judgment error in a case where the information detecting circuit of FIG. 10 is used.

FIG. 12 shows an example of a manner of convergence of the phase error at the occurrence of a judgment error in a case where the information detecting circuit 104 of FIG. 10 is used. In this manner, by using the information detecting circuit 104 of FIG. 10, as in the case of using the information detecting circuit of FIG. 3 (see FIG. 5), the phase error can be converged to an integer period (in the case of FIG. 12, a 1 period or a −1 period) more quickly than in the conventional case of FIG. 1.

Figure 13:
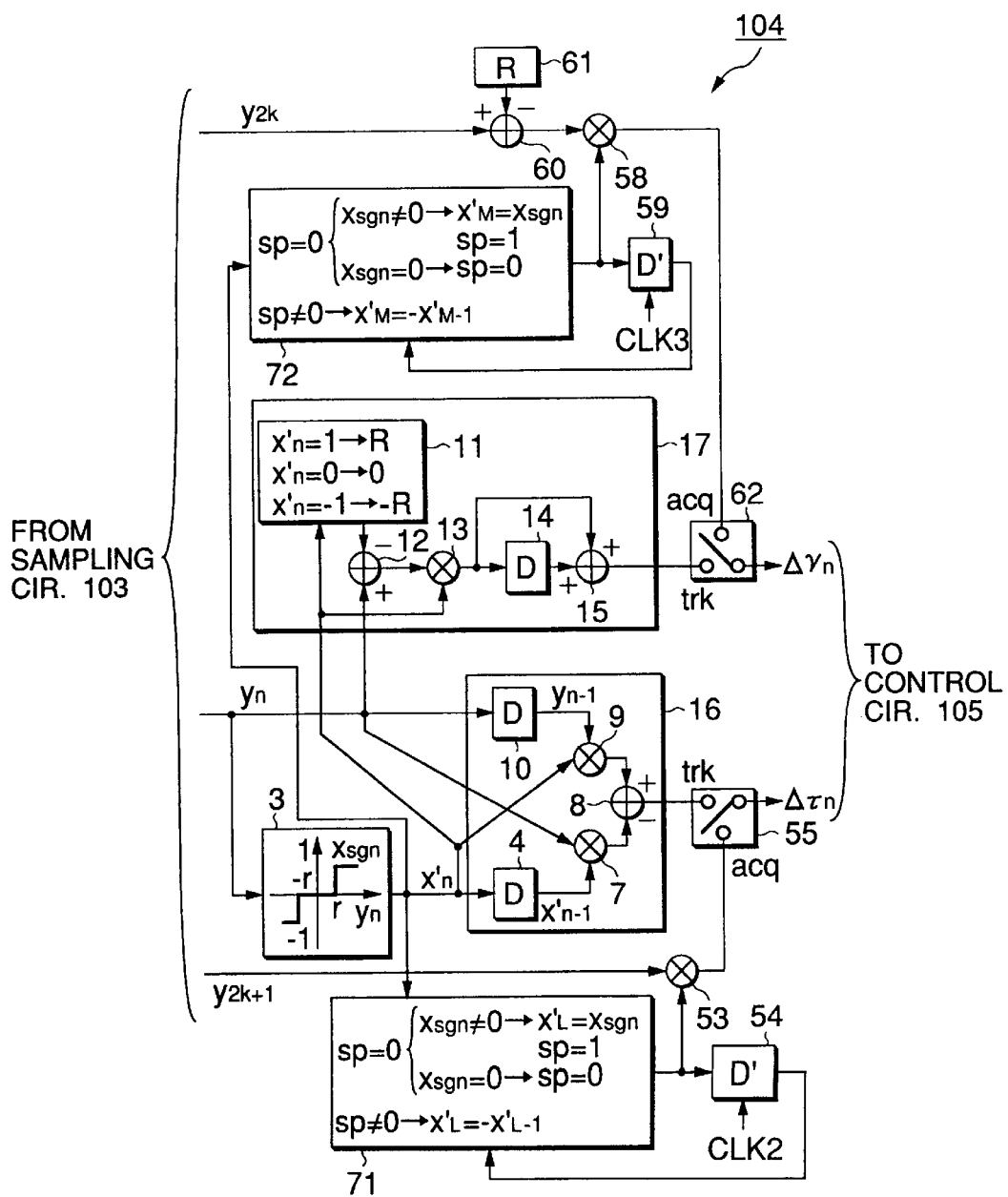
FIG. 13 is a block diagram showing still another example of configuration of the information detecting circuit of FIG. 2.

FIG. 13 shows still another example of configuration of the information detecting circuit 104. This information detecting circuit 104 is one obtained by omitting the comparators 51 and 56 of the information detecting circuit 104 of FIG. 10 and employing judgment circuits 71 and 72 (prediction value calculating means) instead of the judgment circuits 52 and 57 of the information detecting circuit 104 of FIG. 10. Therefore, the judgment circuits 71 and 72 will be described below.

The judgment circuit 71 holds a state variable sp. The initial value of the state variable sp is set at 0. Thereafter, where sp is equal to 0, if a value $x_{sgn}$ that is supplied from the judgment circuit 3 is not equal to 0, the judgment circuit 71 outputs the value $x_{sgn}$ to the multiplier 53 and the delay circuit 54 as a prediction value $x'_L$ and then sets the value of sp at 1. If the value $x_{sgn}$ that is supplied from the judgment circuit 3 is equal to 0, the judgment circuit 71 performs no operation. Where sp is not equal to 0, the judgment circuit 71 outputs, as the prediction value $x'_L$, a value $-x'_{L-1}$ that is obtained by inverting the sign of the 1-clock (one clock of CLK2) preceding prediction value $x'_{L-1}$.

The judgment circuit 72 holds a state variable sp. The initial value of the state variable sp is set at 0. Thereafter, where sp is equal to 0, if a value $x_{sgn}$ that is supplied from the judgment circuit 3 is not equal to 0, the judgment circuit 72 outputs the value $x_{sgn}$ to the multiplier 58 and the delay circuit 59 as a prediction value $x'_M$ and then sets the value of sp at 1. If the value $x_{sgn}$ that is supplied from the judgment circuit 3 is equal to 0, the judgment circuit 72 performs no operation. Where sp is not equal to 0, the judgment circuit 72 outputs, as the prediction value $x'_M$, a value $-x'_{M-1}$ that is obtained by inverting the sign of the 1-clock (one clock of CLK3) preceding prediction value $x'_{M-1}$.

Figure 14:
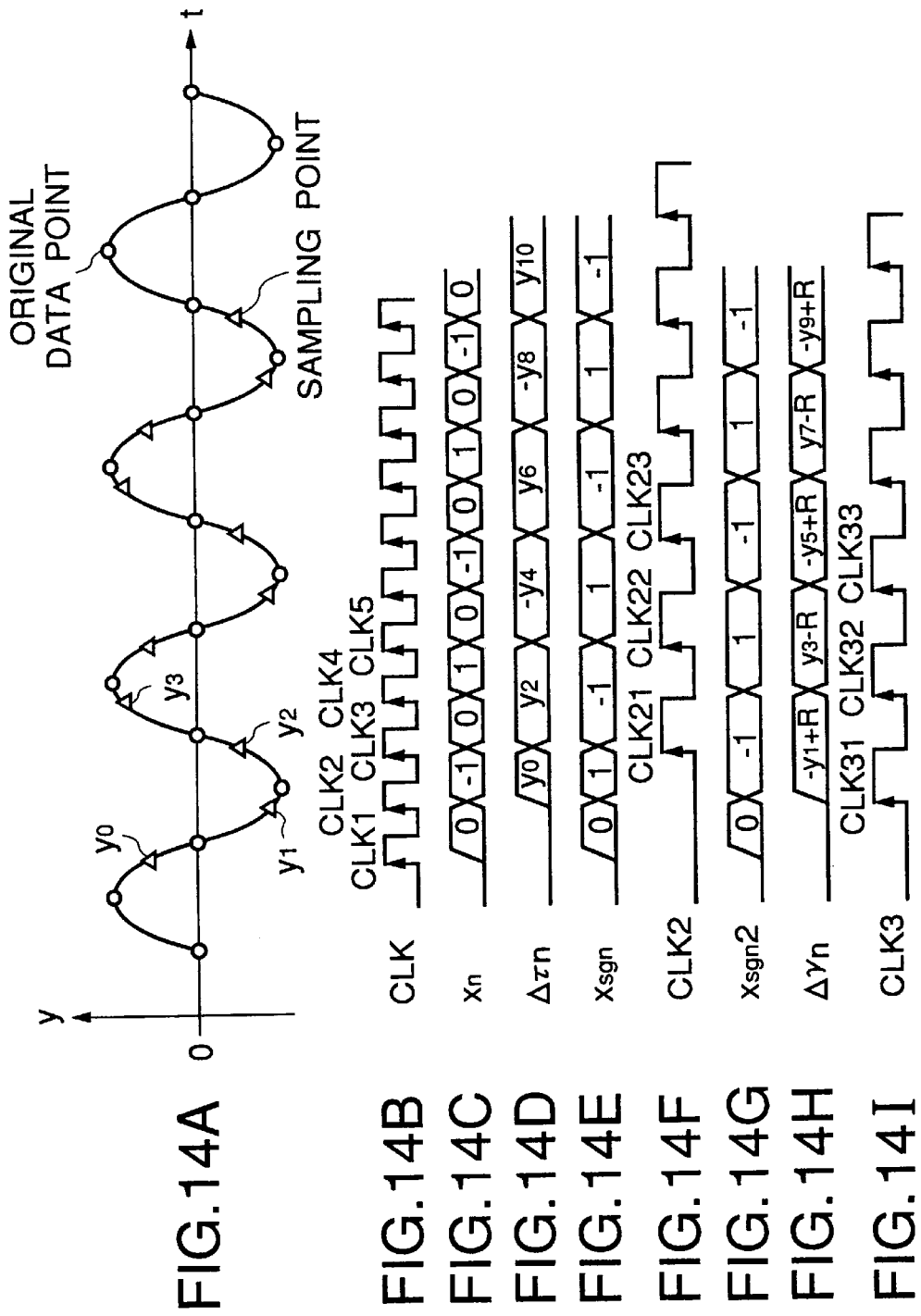
FIGS. 14A–14I are a timing chart illustrating an operation of the information detecting circuit of FIG. 13.

For example, where sampled values $y_n$ of a reproduction signal y corresponding to the above-mentioned pattern $\{\ldots, 0, 1, 0, -1, 0, \ldots\}$ are supplied as shown in FIG. 14A, the information detecting circuit 104 outputs phase errors $\Delta\tau_n$ shown in FIG. 14D and level errors $\Delta\gamma_n$ shown in FIG. 14H to the control circuit 105.

With the above configuration, the circuits for calculating the phase error $\Delta\gamma_n$ and the level error $\Delta\gamma_n$ from the sampled value $y_n$ of the reproduction signal y that corresponds to the above-mentioned pattern $\{\ldots, 0, 1, 0, -1, 0, \ldots\}$ operate on the clock signals whose period is two times that of the sampling clock signal. Therefore, a low-speed, low-power-consumption information detecting circuit can be constructed.

Figure 15:
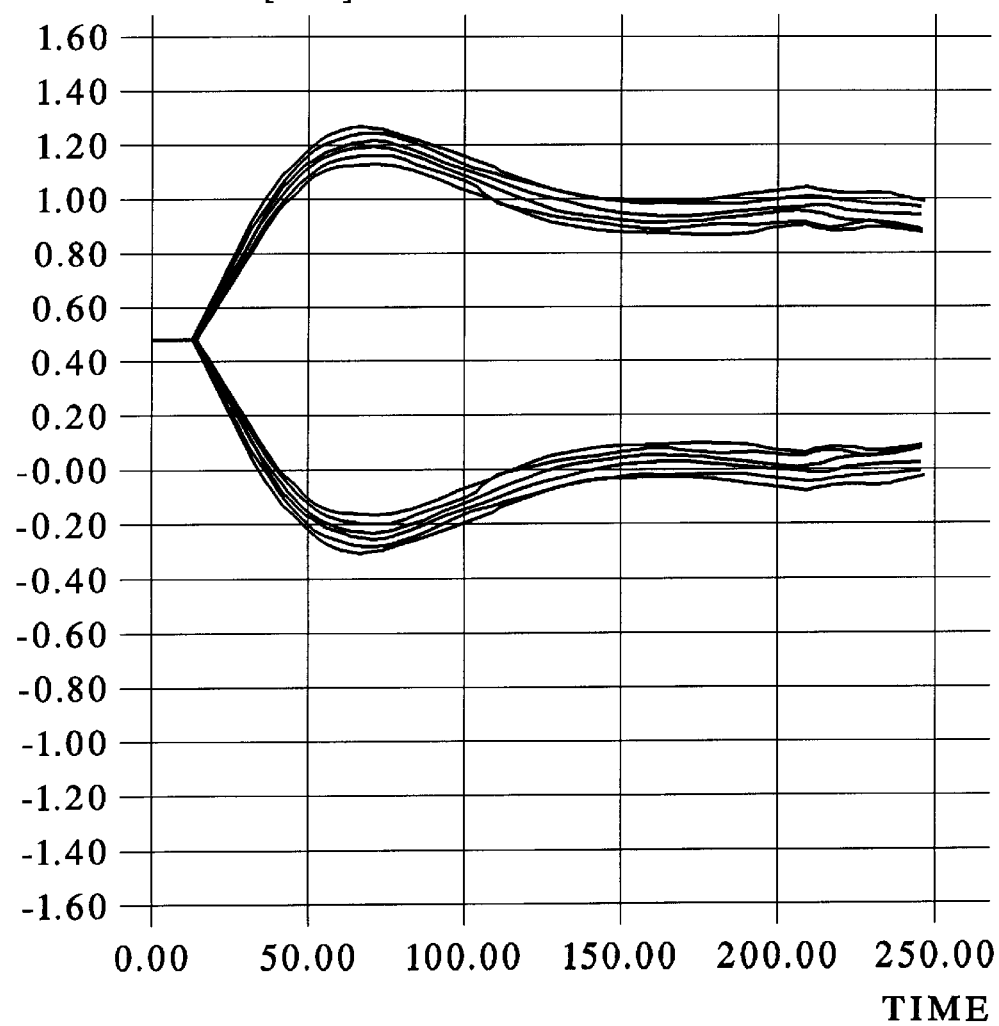
FIG. 15 shows an example of a manner of convergence of the phase error at the occurrence of a judgment error in a case where the information detecting circuit of FIG. 13 is used.

FIG. 15 shows an example of a manner of convergence of the phase error in a case where the information detecting circuit 104 of FIG. 13 is used. In the information detecting circuit 104 of FIG. 13, the judgment circuit 3 performs a ternary judgment in judging the first code. Therefore, the detection period is shortened, and hence as shown in FIG. 15 the phase error can be converged to an integer period (in the case of FIG. 15, a 1 period or a −1 period) more quickly than in the case of FIG. 12.

As described above, the information detecting circuit 104 of the invention calculates a phase error $\Delta\tau_n$ and a level error $\Delta\gamma_n$ from a sampled value $y_n$ and amplifies and samples a reproduction signal by utilizing the calculated phase and level errors. Therefore, the signal processing can be performed satisfactorily.

Although the above embodiments are directed to the case where the invention is applied to a reproduction apparatus, it goes without saying that the invention can be applied to other kinds of apparatuses.

As described above, according to the information detecting apparatus and method of the invention, a prediction value of a code of a partial response format that constitutes a predetermined, given pattern is calculated in accordance with past prediction values of codes. Therefore, the rate of occurrence of prediction value judgment errors can be reduced.

What is claimed is:

1. An information detecting apparatus which processes an analog signal corresponding to codes of a partial response format in synchronism with a given clock signal and outputs level information and/or phase information corresponding to a level and/or a phase of the analog signal, comprising:

first prediction value calculating means for calculating a prediction value of a code of a partial response format that constitutes a predetermined, given pattern in accordance with a past prediction value of the code; and information calculating means for calculating the level information and/or the phase information from a value of the analog signal and the calculated prediction value of the code, wherein, the pattern is such that a pattern {0, 1, 0, −1} consecutively appears a given number of times, and the first prediction value calculating means calculates a prediction value of a code of a partial response format that constitutes the pattern in accordance with a 1-clock preceding prediction value of the code.

2. The information detecting apparatus according to claim 1, wherein the codes of the partial response format are codes of a partial response (1, 1) format.

3. The information detecting apparatus according to claim 1, wherein the first prediction value calculating means calculates a prediction value of a first code by performing a binary judgment on a value of the analog signal corresponding to the codes of the partial response format.

4. An information detecting apparatus which processes an analog signal corresponding to codes of a partial response format in synchronism with a given clock signal and outputs level information and/or phase information corresponding to a level and/or a phase of the analog signal, comprising:

first prediction value calculating means for calculating a prediction value of a code of a partial response format that constitutes a predetermined, given pattern in accordance with a past prediction value of the code;

information calculating means for calculating the level information and/or the phase information from a value of the analog signal and the calculated prediction value of the code;

second prediction value calculating means for calculating a prediction value of the code from a value of an analog signal corresponding to a code of a partial response format; and selecting means for selecting the prediction value calculated by the first prediction value calculating means when an analog signal corresponding to codes of a first partial response format that constitute a predetermined, given pattern is supplied, and selecting the prediction value calculated by the second prediction value calculating means when an analog signal corresponding to codes of a partial response format other than the first partial response format is supplied, and for outputting the selected prediction value to the information calculating means.

5. An information detecting apparatus which processes an analog signal corresponding to codes of a partial response format in synchronism with a given clock signal and outputs level information and/or phase information corresponding to a level and/or a phase of the analog signal, comprising:

first prediction value calculating means for calculating a prediction value of a code of a partial response format that constitutes a predetermined, given pattern in accordance with a past prediction value of the code; and information calculating means for calculating the level information and/or the phase information from a value of the analog signal and the calculated prediction value of the code, wherein, the first prediction value calculating means makes the prediction value either 1 or −1 by performing a binary judgment on a value of the analog signal corresponding to the codes of the partial response format if a 1-clock preceding prediction value is 0, and makes the prediction value 0 if the 1-clock preceding prediction value is not 0.

6. The information detecting apparatus according to claim 5, wherein the first prediction value calculating means performs the binary judgment by using a threshold value corresponding to a 2-clock preceding prediction value.

7. The information detecting apparatus according to claim 5, further comprising judging means for performing a ternary judgment of 0, 1, and −1 on a value of the analog signal corresponding to the codes of the partial response format, wherein the first prediction value calculating means calculates the prediction value if a judgment result of the judging means is a given one of 0, 1, and −1.

8. An information detecting apparatus which processes an analog signal corresponding to codes of a partial response format in synchronism with a given clock signal and outputs level information and/or phase information corresponding to a level and/or a phase of the analog signal, comprising:

first prediction value calculating means for calculating a prediction value of a code of a partial response format that constitutes a predetermined, given pattern in accordance with a past prediction value of the code; and information calculating means for calculating the level information and/or the phase information from a value of the analog signal and the calculated prediction value of the code, wherein, the first prediction value calculating means outputs, as a prediction value of the code at a given clock, a value obtained by inverting a sign of a 2-clock preceding prediction value of the code.

9. An information detecting apparatus which processes an analog signal corresponding to codes of a partial response format in synchronism with a given clock signal and outputs level information and/or phase information corresponding to a level and/or a phase of the analog signal, comprising:

first prediction value calculating means for calculating a prediction value of a code of a partial response format that constitutes a predetermined, given pattern in accordance with a past prediction value of the code;

information calculating means for calculating the level information and/or the phase information from a value of the analog signal and the calculated prediction value of the code;

amplitude adjusting means for adjusting amplitude of the analog signal;

sampling means for sampling values of the analog signal with a given phase;

first control means for controlling the amplitude adjusting means in accordance with the level information; and second control means for controlling the sampling means in accordance with the phase information.

* * * * *